(12) United States Patent
Hamilton

(10) Patent No.: US 6,462,842 B1
(45) Date of Patent: Oct. 8, 2002

(54) APPARATUS, METHOD, AND COMPUTER PROGRAM FOR INCREASING SCANNER DATA THROUGHPUT

(75) Inventor: Frederick McGuire Hamilton, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/166,871

(22) Filed: Oct. 6, 1998

(51) Int. Cl.[7] .................................................. H04N 1/04
(52) U.S. Cl. ....................... 358/486; 358/412; 358/442; 358/445; 358/497
(58) Field of Search ................................. 358/442, 486, 358/474, 445, 412, 409, 451, 497, 494, 483, 448

(56) References Cited

U.S. PATENT DOCUMENTS

| | | | |
|---|---|---|---|
| 4,314,281 A | 2/1982 | Wiggins et al. ............. 358/280 |
| 4,327,377 A | 4/1982 | Takken ........................ 358/199 |
| 4,366,508 A | * 12/1982 | Crean et al. ................ 358/451 |
| 4,375,652 A | 3/1983 | White ......................... 348/295 |
| 4,523,101 A | 6/1985 | Tsunekawa ................. 250/578 |
| 4,771,333 A | 9/1988 | Michaels .................... 358/483 |
| 4,839,741 A | 6/1989 | Wilson ........................ 358/404 |
| 4,878,119 A | 10/1989 | Beikirch et al. ............ 358/471 |
| 5,043,827 A | 8/1991 | Beikirch ...................... 358/471 |
| 5,336,878 A | 8/1994 | Boyd et al. ............... 250/208.1 |
| 5,369,504 A | 11/1994 | Walker ....................... 358/437 |
| 5,416,611 A | 5/1995 | Tandon ....................... 358/474 |
| 5,473,445 A | 12/1995 | Takei et al. ................. 358/474 |
| 5,491,397 A | 2/1996 | Hirakawa .................... 318/696 |
| 5,517,331 A | * 5/1996 | Murai et al. ................ 358/486 |
| 5,519,514 A | 5/1996 | TeWinkle .................... 358/514 |
| 5,541,645 A | 7/1996 | Davis ........................... 348/96 |
| 5,585,620 A | 12/1996 | Nakamura et al. ........ 250/208.1 |
| 5,627,367 A | 5/1997 | Sofield ..................... 250/252.1 |
| 5,682,033 A | 10/1997 | Cattorini .................. 250/208.1 |
| 5,687,009 A | 11/1997 | Walsh et al. ................ 358/486 |
| 5,703,700 A | 12/1997 | Birgmeir et al. ............ 358/487 |
| 5,821,977 A | 10/1998 | Nishimura ................... 347/234 |
| 5,943,139 A | * 8/1999 | Tang et al. ................. 382/412 |
| 6,160,636 A | * 12/2000 | Nagano et al. ............. 358/412 |

OTHER PUBLICATIONS

Declaration Of Frederick McGuire Hamilton Per 37 C.F.R. §1.56.

U.S. patent application No. 09/246,498; filed Feb. 8, 1999. Inventors: Ronald Hou Kern Tom, et al. Invention title: "Apparatus, Method and Computer Program to Reduce Distortion of Scanner Restarts".

\* cited by examiner

*Primary Examiner*—Cheukfan Lee
(74) *Attorney, Agent, or Firm*—Mark C. Pickering

(57) ABSTRACT

An apparatus, method, and computer program improve scanning time by transferring data from a scanner to an associated device at a rate approximately equal to the average data transfer rate. The computer program sets a control variable that controls hardware in the scanner to adjust the scanning clock frequency, the vertical resolution, and the horizontal resolution to approach the average data transfer rate. Scanning at the average data transfer rate improves scanning time because restarts are eliminated.

64 Claims, 6 Drawing Sheets

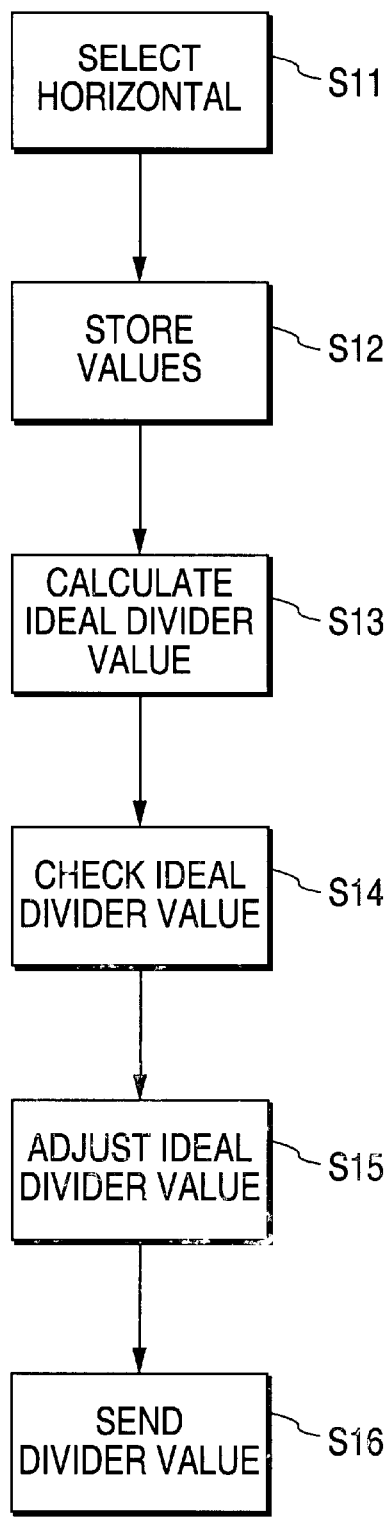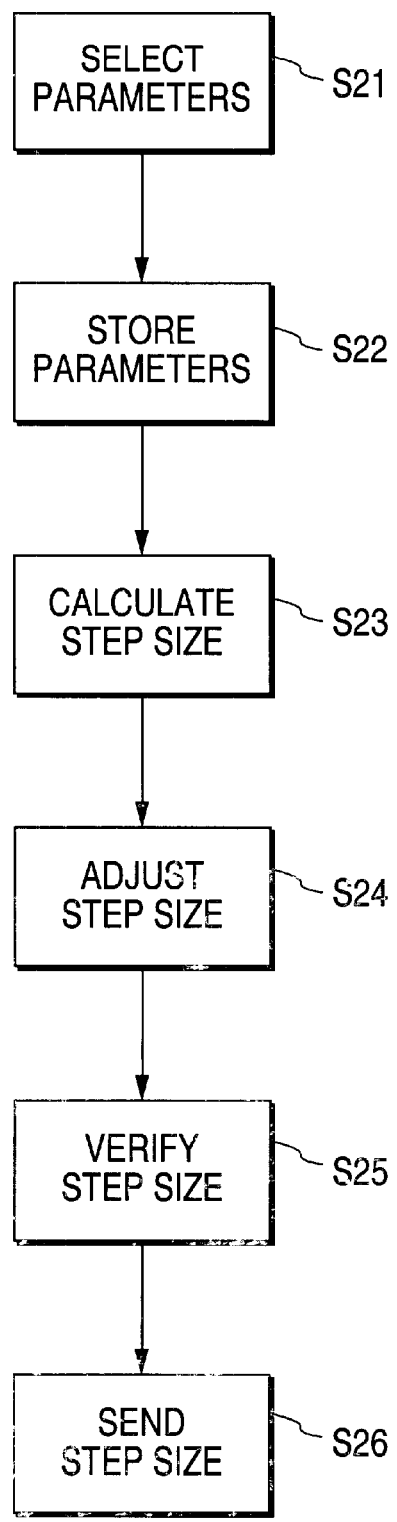
FIG. 2
FIG. 4

APPARATUS, METHOD, AND COMPUTER PROGRAM FOR INCREASING SCANNER DATA THROUGHPUT

BACKGROUND OF THE INVENTION

1. Field of the Invention

The present invention relates to scanners capable of scanning at a number of horizontal and vertical resolutions and capable of processing scanned data at a number of clock frequencies. In particular, the present invention relates to scanners that process data at a rate approximately equal to an average data transfer rate between the scanner and a receiving device.

2. Description of the Related Art

A scanner generally includes a sensor, a light source, a processor to process the information sensed by the sensor, a buffer to store the information, and a stepper motor to move the sensor. The processor processes data at a given clock speed, stores the data in the buffer, and supplies it to an associated personal computer (PC). The sensor includes a number of light-sensing elements and typically extends horizontally across the scan area. The horizontal area covered by the sensor is called a scan line. The amount of time the scanner takes to scan one scan line is called the integration time. The stepper motor moves the sensor vertically across the scan area. One unit of movement of the stepper motor is called a step.

Existing scanners have a number of problems, including the following three concerns. First, many existing scanners do not consider the scanner-to-PC data rate (also called the PC IO speed) when sending data to the PC. The clock speed of the scanner controls the rate at which analog data from the sensor is converted into digital image data. Ideally one would like a scan to go as fast as possible, so a high clock speed would seem to be preferred. However, the maximum data transfer rate from the scanner to the PC provides a bottleneck. This bottleneck causes the buffer to eventually fill up, forcing the scanner to pause and resume once the buffer has been emptied, which wastes time.

For example, assume an image data size of 25 MB, which is approximately the data size of an 8.5 by 11 inch image scanned at 300 by 300 dots per inch (DPI) resolution in red/green/blue (RGB) color. Further assume a scan rate (the speed at which the scanner scans the image) of 1 megabyte per second (MB/s), a data transfer rate (the speed at which the scanner transfers the image data to the PC) of 0.8 MB/s, a buffer size of 100 kB, and a resume time of 0.5 seconds. The ideal scan time is the image data size divided by the data transfer rate, which is (25 MB/0.8 MB/s=31.25) 31.25 seconds. However, the time to fill the buffer is the buffer size divided by the difference between the scan rate and the data transfer rate, which is (100 kB/s/(1.0–0.8 MB/s)=0.5) 0.5 seconds. At this point the scanner pauses, having transferred only 0.5 MB of the image data. This implies 50 pauses for the 25 MB image. The time to empty the buffer is the buffer size divided by the data transfer rate, which is (100 kB/0.8 MB/s=0.125) 0.125 seconds. Once the buffer is emptied, the scanner takes a finite time to resume, 0.5 seconds in this example. Thus, the actual scan time is the number of pauses times the sum of the time to fill the buffer, the time to empty the buffer, and the resume time, which is (50* (0.5+0.125+0.5)=56.25) 56.25 seconds. This is (56.25/31.25=1.8) 1.8 times longer than the ideal scan time.

One way to improve the actual scan time to approach the ideal scan time is to provide a larger buffer. However, this increases the cost of the scanner. It also fails to directly improve the restart time (although it does decrease the number of restarts necessary for a given scan). Another way is to increase the transmission capacity of the scanner-to-PC link to eliminate the bottleneck. However, at foreseeable relative technology levels, processors will continue to be able to process data faster than transmission links can transmit it, so the bottleneck would likely remain. Thus, a way is needed to decrease or eliminate the number of pauses.

Second, many existing scanners tie the stepper motor speed to the integration period (the time required to scan one horizontal line). The stepper motor controls the vertical resolution because it moves the sensor vertically across the item to be scanned. These scanners lock the step period (the time required to go one vertical step) to the integration period. These scanners can take only an integer number of steps each integration period.

A problem resulting from this is that the scanner supports only a few resolutions. For example, for a 600 DPI sensor with a step size of ⅙₀₀th of an inch, taking integer steps results in resolutions of 600 DPI at one step per integration period, 300 DPI at two steps, 200 DPI at three steps, 150 DPI at four steps, etc. A popular solution is to discard lines that are scanned. For example, to scan at 500 DPI, the sensor moves one step per integration period (resulting in a 600 DPI actual scan) and then 100 lines per inch are discarded. This can burden the scanner because the scanner must spend the time to scan lines that will not be used. This results in a longer scan time than is required. Thus, a way is needed to increase the number of available resolutions without unnecessarily burdening the scanner.

Third, many existing scanners discard pixels that are read by the sensor to reduce the horizontal resolution of the scanned image. Reducing resolution at the scanner reduces the amount of data that must be transmitted to the PC and can improve scan time. The sensor still reads the full number of analog pixels according to its resolution capacity, but the processor discards pixels before processing them into the digital scanned image data. For example, for a 600 DPI sensor, if a resolution of 300 DPI is desired, the processor may discard every other pixel. This discarding can result in aliasing because information is lost. To provide the best image quality, a way is needed to retain the full amount of information while still reducing the resolution.

SUMMARY OF THE INVENTION

The present invention addresses these and other problems of the prior art by providing an apparatus, method, and computer program for increasing data throughput, increasing available resolutions, and reducing aliasing in scanners.

According to one embodiment, an apparatus according to the present invention controls a scanner to increase data throughput, and includes a data rate adjustment circuit to control a rate at which processed scanner data is generated. The data rate adjustment circuit may adjust the scanning clock frequency, the vertical resolution, and the horizontal resolution. A further embodiment is a scanner including the data rate adjustment circuit. Adjustment of the data rate allows the apparatus to match the average data transfer rate to an associated device, which eliminates restarts.

According to another embodiment, an apparatus according to the present invention controls a scanner to increase available resolutions, and includes a step signal generation circuit to generate a signal indicative of one of a plurality of resolutions corresponding to a non-integer number of steps per line. A further embodiment is a scanner including the step signal generation circuit. Generating a non-integer number of steps per line increases the available number of resolutions and eliminates the time used to scan lines that may be later discarded.

According to yet another embodiment, an apparatus according to the present invention controls a scanner to reduce aliasing, and includes an averaging circuit to average together pixels to generate processed scanner data. A further embodiment is a scanner including the averaging circuit. Averaging pixels reduces the aliasing inherent in scanners that discard pixels.

According to still another embodiment, a method according to the present invention controls a scanner to increase data throughput, and includes the step of scanning an image such that processed image data is generated at a rate approximately equal to an average data transfer rate. The step of scanning may include the steps of adjusting the scanning clock frequency, adjusting the vertical resolution, and adjusting the horizontal resolution.

According to another embodiment, a method according to the present invention controls a scanner to increase available resolution, and includes the step of adjusting a step size of relative movement between an image and a scanner sensor, wherein the step size corresponds to a non-integer number of steps per line.

According to yet another embodiment, a computer program according to the present invention controls a scanner to increase data throughput, and includes a target rate calculation subroutine that calculates a target rate approximately equal to an average data transfer rate.

According to still another embodiment, a computer program according to the present invention controls a scanner to increase available resolutions, and includes a step size calculating subroutine that calculates a step size of relative movement between an image and a scanner sensor, wherein the step size corresponds to a non-integer number of steps per line.

BRIEF DESCRIPTION OF THE DRAWINGS

FIG. 2 is a block diagram showing the steps performed by the present invention to calculate the clock divider value.

FIG. 4 is a block diagram showing the steps performed by the present invention to calculate the step size.

DETAILED DESCRIPTION OF THE PREFERRED EMBODIMENTS

In a preferred embodiment, part of the invention is embodied in hardware and part is embodied in software. The following sections detail which aspects of the invention are embodied in each. However, the various subcomponents of the invention may be allocated between the hardware and the software differently than that in the preferred embodiment and still perform the functions of the invention.

In general, the hardware is an application-specific integrated circuit (ASIC) built at 0.5 micron fabrication processes and designed to operate at 5 volts. The ASIC has 100 pins for communication with an associated PC and with the scanner hardware (e.g., stepper motor, sensor, etc.). The ASIC has numerous circuits for controlling the scanner hardware, apparent to those skilled in the art and not further detailed here, in addition to the circuits embodying the present invention.

In general, the software source code is written in C and the object code is intended to run on the associated PC to provide a user interface and to issue instructions to the ASIC. However, the software could also be implemented as microcode that is intended to run on a microcontroller. Furthermore, although specifically designed for use with an associated PC, the present invention may also be applied to other computing devices. The software contains many functions, apparent to those skilled in the art and not further detailed here, in addition to the functionality of the present invention.

The following sections describe the clock frequency adjustment feature, the step size adjustment feature, the pixel averaging feature, and the combined operation of these three features of the present invention.

Clock Frequency Adjustment

The scanning clock frequency determines the rate at which the raw image data read by the sensor is converted into the scanned image data for transmission to the PC. As discussed above, if the scanned image data is generated at a rate greater than the average data transfer rate from the scanner to the PC, the buffer will fill up and the scanner must pause and resume, which increases scan time.

The present invention addresses this problem by calculating the average scanner-to-PC data transfer rate and adjusting the scanning clock frequency so that raw image data is converted and transmitted to the PC at that rate. Matching the actual transmission rate to the average transmission rate eliminates the need to restart because the scanner's buffer never completely fills. Eliminating restarts improves the scan time.

Preferably, the software calculates the average data transfer rate when the software is activated. The software requests the scanner to transmit some data to the PC and the software calculates the time the data takes to transfer.

Figure 1:
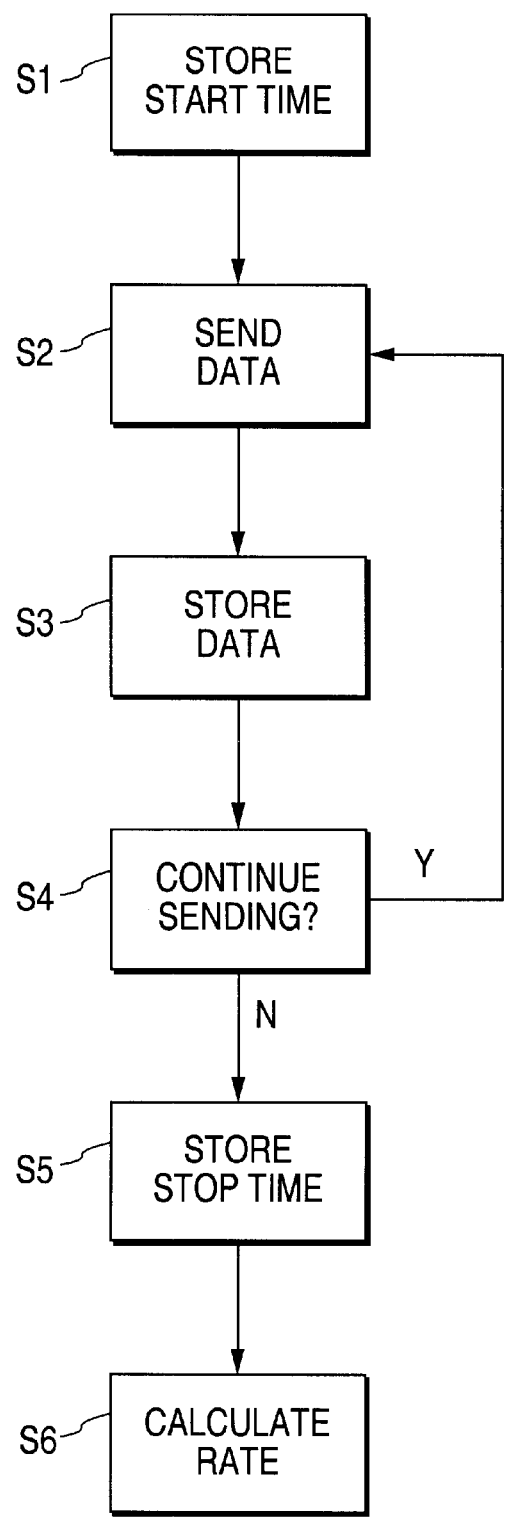
FIG. 1 is a block diagram showing the steps performed by the present invention to calculate the average data transfer rate.

FIG. 1 shows more specifically that in step S1 the software stores the current time as the start time and sends a data transfer request to the scanner. In step S2 the scanner receives the request and starts sending data. This data may be all zeros or may be garbage data stored by the scanner. In step S3 the PC receives the data and stores it as the PC would during a normal scan. In step S4 the software has the scanner continue to send data until a specified amount of data has been sent, preferably between one and ten megabytes. The choice of one to ten megabytes may be increased or decreased as desired.

In step S5 the software sends a stop data transfer request to the scanner and stores the current time as the stop time. In step S6 the software divides the total amount of data transferred by the difference between the stop time and the start time. This calculation results in the average data transfer rate.

Besides the steps described in FIG. 1, other procedures are possible. Instead of calculating the average transmission rate when the software is started, the software may do this at other times, such as before each scan. Instead of requesting the data transfer until one to ten megabytes have been sent, the software may instead stop the transfer after the PC has received data for a specified period of time, for example, five to ten seconds. In addition, the data rate may be measured in units of pixels transferred instead of bytes transferred.

FIG. 2 shows the steps performed by the software to adjust the scanning clock frequency. In step S11 the user selects the horizontal resolution and the horizontal scan size. The horizontal scan size may be less than the maximum size the sensor is capable of scanning. If the hardware is not capable of scanning at the selected horizontal resolution then the software uses the next higher resolution at which the scanner can scan.

In step S12 the software stores the horizontal resolution, the horizontal scan size, the average data transfer rate, the number of steps per inch the stepper motor is capable of taking, and the master clock frequency of the scanner. The master clock frequency of the scanner in the present invention is 48 MHz.

In step S13 the software calculates an ideal clock divider factor. Optimally, the scanner output rate should equal to or slightly less than the average scanner-to-PC data transfer rate. The scanner output rate is the number of pixels per line generated by the ASIC (dependent upon the horizontal scan size and the desired horizontal resolution) divided by the time taken to scan one line (the integration time). The integration time is the number of pixels in the sensor times the amount of time it takes to process one pixel. The time to process one pixel is P clock periods. Thus, $$IdealDivider = \frac{MasterClock}{AverageRate} \cdot \frac{PixelsPerLine}{TotalPixels} \cdot \frac{1}{P}$$

where IdealDivider is the ideal clock divider factor, MasterClock is the frequency of the master clock, AverageRate is the average data transfer rate in pixels per second, PixelsPerLine is the number of pixels per line that are to be transmitted to the PC, TotalPixels is the total number of pixels in the sensor, and P is the number of clock periods the scanner takes to process one pixel. The result from the IdealDivider equation is rounded up to the nearest available divider (see step S15 below).

The value of PixelsPerLine depends upon the size of the area to be scanned (which will be less than or equal to the total number of pixels in the sensor) and upon the desired resolution (for example, wanting 300 DPI from a 600 DPI sensor).

The value of P depends on the scanner hardware, which is configured to take P clock periods to process each pixel. For gray scale (or monocolor) pixels, P is set at 8 in the present invention. Color pixels may be viewed as being composed of three monocolor pixels (red, green, and blue). The time taken to process one pixel is termed the pixel period. Therefore it takes 1 pixel period to process a gray pixel, and 3 pixel periods to process a color pixel. A constant C will be used where needed, where C=1 for grayscale scanning and C=3 for color scanning. Thus, $$PixelFrequency = \frac{MasterClock}{ClockDivider} \cdot \frac{1}{C} \cdot \frac{1}{P}$$

In step S14 the software checks whether the ideal clock divider factor is too large or too small based on attributes of the scanner hardware. The minimum clock divider factor is limited by the maximum vertical speed of the sensor (motor speed). The sensor speed is given by the following equation:

$$SensorSpeed = \frac{PixelFrequency}{StepSize \cdot FSPI \cdot M}$$

where PixelFrequency is the frequency at which pixels are read from the sensor (the inverse of the pixel period), StepSize is the number of pixels processed each microstep, FSPI is the number of full steps required for the stepper motor to move the sensor one inch, and M is the number of microsteps in each full step, resulting in a sensor speed in inches per second. Thus, $$MinClockDivider = \frac{1}{StepSize \cdot FSPI \cdot M} \cdot \frac{MasterClock}{P \cdot C} \cdot \frac{1}{MaxSensorSpeed}$$

where MaxSensorSpeed depends upon the sensor and the stepper motor, and P*C is the number of clock periods it takes to process one pixel. The result from the MinClockDivider equation is rounded up to the nearest available divider (see step S15 below). If the ideal clock divider has been calculated to be less than the minimum clock divider, then the software increases the clock divider to the minimum.

The maximum clock divider factor is limited by the saturation period of the sensor. Each sensor has a maximum integration time. Thus, $$MaxClockDivider = \frac{MaxIntegrationTime}{TotalPixels} \cdot \frac{MasterClock}{P \cdot C}$$

where MaxIntegrationTime is the maximum integration time of the sensor in seconds, and the other terms are as defined above. The result from the MaxClockDivider equation is rounded down to the nearest available divider (see step S15 below). If the ideal clock divider has been calculated to be greater than the maximum clock divider, then the software decreases the clock divider to the maximum.

Figure 7:
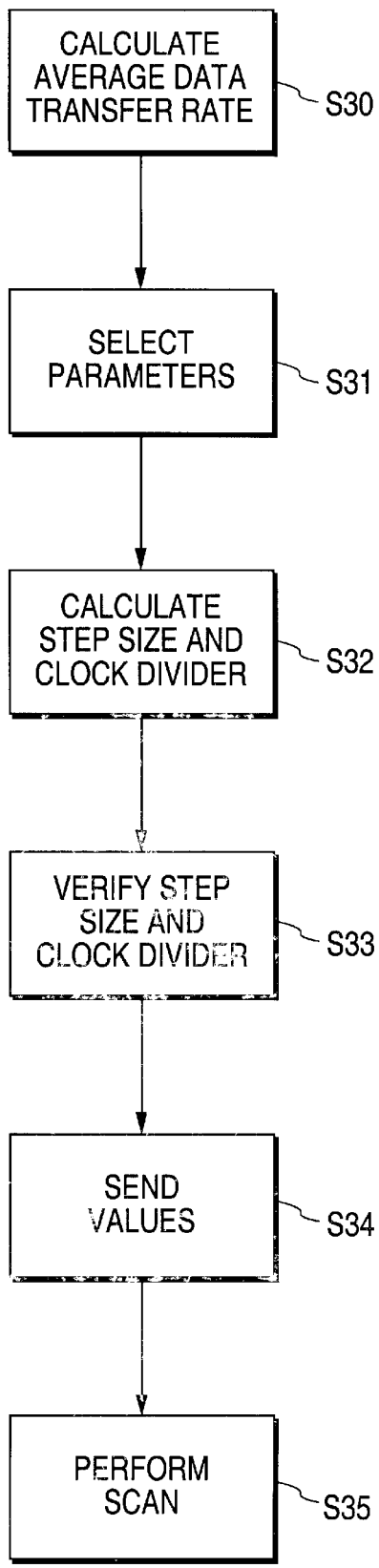
FIG. 7 is a block diagram showing the steps performed during a scan by the present invention.

If the minimum clock divider is greater than the maximum clock divider, for example, when a quick, low resolution scan is desired, a preferred solution is to adjust the StepSize value (see step S33 in FIG. 7).

In step S15 the software adjusts the ideal clock divider factor into the closest clock divider that the ASIC can accept. The ASIC is configured to have 64 available dividers, from 1.0 to 32.5 inclusive, in 0.5 increments.

If the ideal is between the minimum and the maximum, then the software uses the ideal value, which was rounded up (see step S13 above). Rounding up causes the ASIC to generate data at a slower rate than the average data transfer rate, but necessitates fewer pauses than rounding down. Empirical studies have shown that rounding up to the nearest 0.5 is about the same as rounding down. However, rounding at greater than 0.5 has a noticeable speed decrease. For example, if the ideal is 1.75, both 1.5 and 2.0 produce about the same scan time; but both 1.0 and 2.5 have noticeable speed decreases.

In step S16 the software supplies the ASIC with the clock divider factor.

Figure 3:
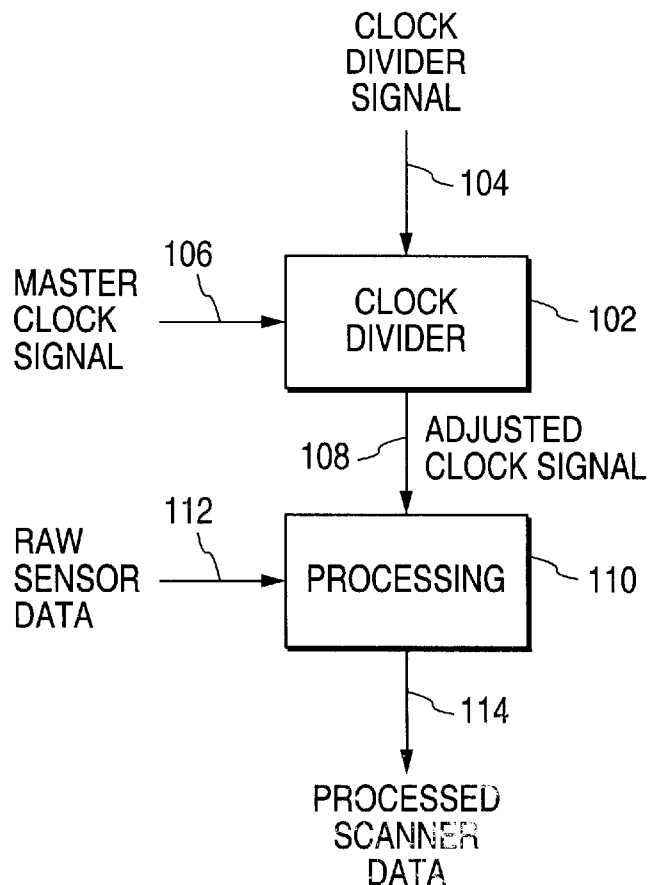
FIG. 3 is a block diagram for the clock adjustment circuit of the present invention.

FIG. 3 identifies the circuits in the ASIC that process the raw scanner data in accordance with the adjusted clock frequency. The clock divider circuit 102 receives the clock divider signal 104 from the software and the master clock signal 106. Master clock signal 106 is implemented at 48 MHz in the present invention. Clock divider circuit 102 divides the master clock signal by the clock divider factor and outputs an adjusted clock signal 108. Processing circuit 110 receives adjusted clock signal 108 and raw sensor data 112, and generates processed scanner data 114 at a rate corresponding to the adjusted clock signal 108, as shown in the following equation:

$$\text{Rate} = \frac{MasterClock}{ClockDivider \cdot P \cdot C}$$

The processed scanner data 114 may be held in a buffer (not shown) before transmission to the PC. Preferred buffers include 64 kB, 128 kB, and 256 kB static random access memories. The software may then request the ASIC to transfer the data from the buffer. Ideally the buffer never completely fills because the processing circuit 110 generates the data at a rate approximately equal to the average data transfer rate. The buffer may fill to 75% when the data transfer rate slows down for a bit, then dip to 25% full when the data transfer rate is a little faster than normal, but staying 50% full on average. It buffers data generated at the fixed scanner speed from data transmitted at the varying PC IO speed.

Clock frequency adjustment is a specific, preferred solution of the general solution of matching the scanner-to-PC data rate to the average data transfer rate. Decreasing the clock frequency increases the integration time because each pixel takes longer to process.

A second specific solution is to increase the integration time by adding clock pulses beyond those necessary to process the pixels in a line. Dummy data is read from the sensor in each of the additional clock pulses. So without changing the clock frequency, the additional pulses increase the integration time. The data rate decreases because the dummy data is not transmitted to the PC. This solution has the advantage of not requiring clock frequency adjustment.

A third specific solution is to reduce the vertical resolution to decrease the amount of data transmitted to the PC, for example, by transmitting fewer lines of pixel data. One way to do this is to move the sensor vertically more quickly so that fewer lines are read. Another way is to discard lines that are scanned. By reducing the amount of data, both of these techniques may improve the data transfer rate.

Step Size Adjustment

As discussed above, many existing scanners tie the stepper motor speed to the integration period. This results in either a reduced number of available resolutions or the unnecessary scanning of lines that are ultimately discarded.

The present invention addresses these problems by decoupling the stepper motor speed from the integration period. This increases the number of resolution options. It also increases the scan speed because only lines that are needed are scanned.

In general, a stepper motor may be powered by two driving signals A and B. These driving signals A and B each have a phase, phase A and phase B, separated from each other by a phase difference of 90 degrees. When phase A is 90 degrees before phase B, the stepper motor moves in one direction (forward). When phase A is 90 degrees after phase B, the stepper motor moves in the opposite direction (backward). The motor driving signals are generally a square wave, a sine wave, or a stepped approximation of a sine wave. When the driving signals are square waves, the stepper motor is said to be "full stepping" because the stepper motor moves a step between a transition of signal A (or B) and the following transition of signal B (or A).

The stepper motor rotates a fixed number of degrees (determined by the manufacturer of the motor) every full step. This rotational motor movement is translated into linear movement by various gears and a belt or cable. The sensor is attached to the belt and moves a certain distance with respect to the item scanned every full step. (Some scanners use the stepper motor to move the item scanned, but the principle is the same.) The number of full steps required to move the sensor one inch with respect to the item scanned is termed the parameter Full Steps Per Inch (FSPI). The value of FSPI is determined by a combination of the motor rotation resulting in a full step and the mechanical design of the scanner's gears and belts. For example, most 600 DPI scanners set the FSPI to 600, so every full step moves the sensor ¹⁄₆₀₀th inch, which is one line of a scan at 600 DPI.

A technique called microstepping may be used to achieve higher resolution from the same stepper motor and sensor hardware. To have the stepper motor microstep, the motor control signals are generated as sine waves. Typically this is done by controlling the current to the stepper motor so that the current approximates a sine wave. Depending upon the resolution of the digital-to-analog converter used to approximate the sine wave, there will be a certain number of microsteps within each full step. (The scanner of the present invention implements four microsteps, and therefore moves in quarter steps.)

A scanner's resolution is determined by the number of pixels in the sensor (horizontally) and by the distance that the horizontal sensor travels in the vertical direction. For example, a letter-sized 600 DPI sensor may have (8.5 inches×600 DPI) 5100 pixels. If this scanner has an FSPI of 600, then to scan an image at 600 DPI vertical by 600 DPI horizontal, the sensor needs to move ¹⁄₆₀₀th inch vertically in the time the scanner processes 5100 pixels. Thus, the scanner must move one full step every 5100 pixels (called the full step size). To scan an image at 300 DPI vertical by 600 DPI horizontal, the scanner must move 2 full steps every 5100 pixels. Because some existing scanners take only an integer number of steps per integration period, these scanners have a limited number of available vertical resolutions.

In the present invention, the number of steps is not tied to the integration period. Specifically, $$StepSize = \frac{PixelsPerLine \cdot VerticalResolution}{FSPI \cdot M}$$

where FSPI and M are as above, VerticalResolution is the desired vertical resolution in DPI, and PixelsPerLine is the number of pixels per line that are to be transmitted to the PC (as described above regarding the clock frequency adjustment). Therefore, StepSize is the number of pixels to count before generating one microstep.

FIG. 4 shows the steps the present invention takes to calculate the step size. In step S21, the user selects the desired vertical resolution, horizontal resolution, and horizontal scan size. In step S22, the software stores the user's selections along with the specific values of FSPI and M for the stepper motor hardware. In step S23, the software calculates StepSize using the above equation.

In step S24, the software adjusts StepSize into a value usable by the ASIC. In the present invention the ASIC can accept a 14-bit integer for StepSize with a minimum value of two. So the software rounds StepSize to the nearest integer between 2 and 16,383, inclusive. Of course, the ASIC can easily be modified to a number greater than 14 bits as desired, for example to support higher resolution scanners.

In step S25, the software increases StepSize if the value is too low for the stepper motor. This adjustment is dependent upon the particular stepper motor implemented in the scanner. If it does this, then the scanner will be scanning at a higher vertical resolution than was requested by the user. So the resolution needs to be adjusted either by dropping lines (performed by many existing scanners, as discussed previously), or by software discarding or interpolation once the image gets to the PC.

In step S26, the software sends StepSize to the ASIC.

Figure 5:
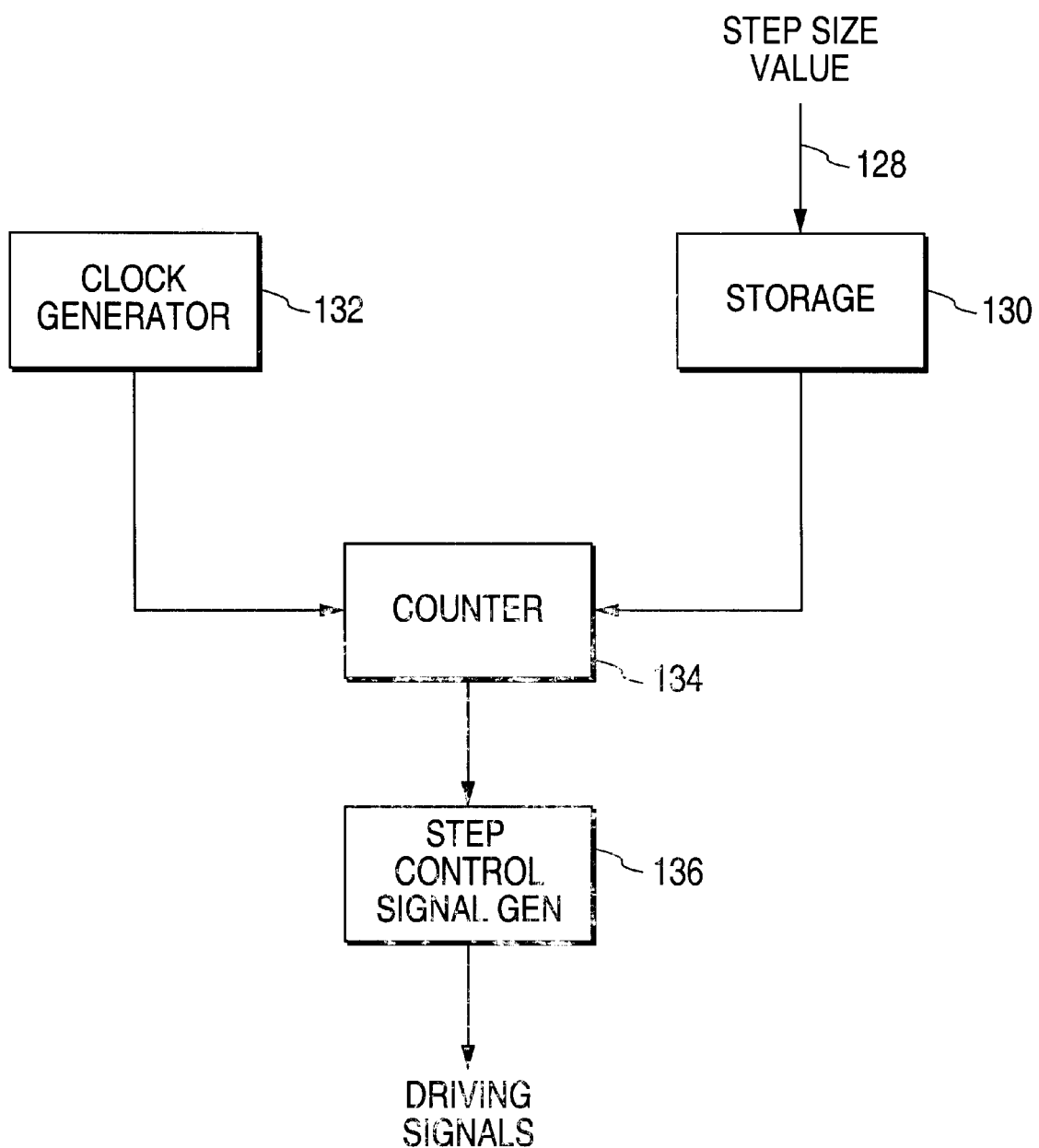
FIG. 5 is a block diagram for the step control signal generator circuit of the present invention.

FIG. 5 identifies the circuit elements in the ASIC that generate the stepper motor control signals. Storage circuit 130 receives the StepSize value 128 from the software and stores it. Clock generation circuit 132 generates a clock signal. Counter circuit 134 counts clock pulses from clock generation circuit 132. When counter circuit 134 has counted enough pulses to equal the StepSize value (provided by the storage circuit 130), it sends a "step now" signal to step control signal circuit 136. (Each pixel takes P*C clock pulses to process, so the counter circuit 134 counts P*C times the number of clock pulses.) Step control signal circuit 136 receives the "step now" signal and generates the driving signals A and B.

In the present invention, driving signals A and B are current signals in a four-stepped approximation of a sine wave. Thus the ASIC generates a quarter step every StepSize pixels. Given the 14-bit range of StepSize, the ASIC allows a wider variety of vertical resolutions as compared to existing scanners. For example, for scanner hardware with an FSPI of 600, 600 DPI horizontal resolution, M of 4, and 9 inch wide sensor, the ASIC can adjust the vertical resolution by 0.44 DPI. Thus, the ASIC can produce 1237 different resolutions between 50 DPI and 600 DPI.

To change the accuracy with which the ASIC can scan (i.e., have more than 1237 resolutions between 50 and 600), one may decrease FSPI, M, or increase PixelsPerLine. Decreasing FSPI and M have some negative side effects, so one would want to increase the pixels per line. Or one could increment the counter 134 at the clock rate, instead of the pixel rate. Then one would have P*C times more resolutions.

Pixel Averaging

As discussed earlier, some existing scanners discard pixels that are read by the sensor to reduce the horizontal resolution of the scanned image. Reducing the resolution in the scanner reduces the amount of data that must be transmitted to the PC, improving scan time. This discarding can result in aliasing because information is lost.

The present invention eliminates aliasing by averaging pixels together instead of discarding them. For example, to reduce the resolution by half, the intensities (brightness levels) of two adjacent pixels are added together and then divided by two to average the two pixels; the processor then averages the next two pixels. To reduce the resolution by twelve, the intensities of twelve adjacent pixels are added together and then divided by twelve; the processor then averages the next twelve pixels. The pixels averaged together are termed a "set" of pixels. Averaging eliminates aliasing because all of the original image information is used to create a single pixel that best represents the original image information. The resulting pixel is equivalent to the pixel that would have been created if the sensor itself had changed resolution.

Figure 6:
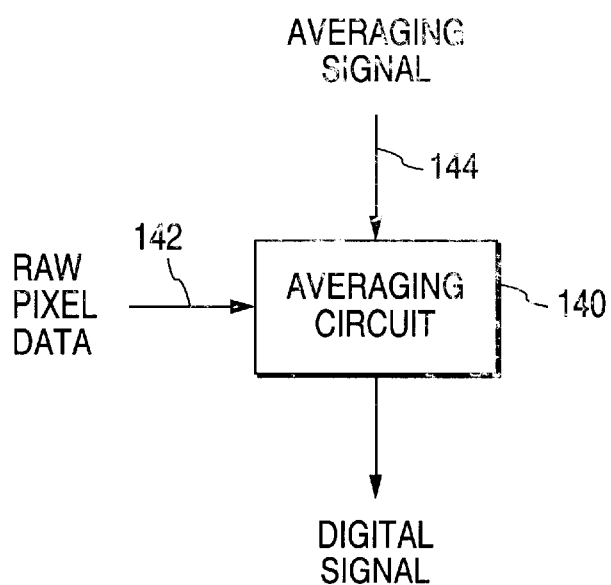
FIG. 6 is a block diagram for the averaging circuit of the present invention.

FIG. 6 illustrates that the averaging operation is preferably implemented as part of the ASIC. An averaging circuit 140 receives the raw pixel data 142 from the sensor at the resolution of the sensor. This raw pixel data 142 is in the form of intensity levels. The averaging circuit 140 also receives an averaging signal 144 indicating how many pixels to average together. The averaging circuit 140 then averages a first set of the designated number of pixels, outputs the averaged pixel data, and then moves on to the next set of pixels. The analog data from the sensor may be converted into digital data for transmission to the PC either before or after the averaging operation.

Hardware is preferred for averaging because it is desirable to reduce the amount of information before transmission to the PC to decrease the scan time and to lessen the processing required to be performed by the PC.

Preferably, eight horizontal resolutions are provided. For a 600 DPI sensor, the eight resolutions are 600, 400, 300, 200, 150, 100, 75, and 50 DPI. For a 300 DPI sensor, the resolutions are 300, 200, 150, 100, 75, 50, 37.5, and 25 DPI. These resolutions are all integer fractions of the sensor resolution except for 400 DPI (for the 600 DPI sensor) and 200 DPI (for the 300 DPI sensor). In such cases, two pixels are averaged as in the normal half-resolution case, but one pixel in the set is counted twice and the sum is divided by three instead of two.

These principles of non-integer fraction averaging may be applied to increase the number of horizontal resolutions provided. For example, to divide the resolution by 4/3 (for example, from 600 DPI to 450 DPI), each set contains two pixels. For the first average, the first pixel is counted three times and the second pixel is counted once, and the sum is divided by four. For the second average, the second pixel is counted twice and the third pixel is counted twice, and the sum is divided by four. For the third average, the third pixel is counted once and the fourth pixel is counted three times, and the sum is divided by four. The fourth average starts the cycle again. Many other resolutions can be accommodated by calculations based on a generalization of this discussion.

In addition, the number of horizontal resolutions may be increased by increasing the integer dividers (for example, five, seven, nine, etc.).

Pixel averaging may also be performed by the software. Although software averaging does not decrease the amount of data that must be transmitted to the PC, software averaging allows for many more resolutions. In the present invention averaging is first performed in the ASIC at the next-highest available resolution to reduce the amount of data that must be transmitted to the PC.

Combined Operation

The three aspects of the invention (clock adjustment, step size adjustment, and pixel averaging) may all operate together. The interrelationship follows from the clock adjustment varying the integration time. A variable integration time entails precise counting of the pixels processed so the stepper motor may be advanced at the proper rate, and entails recognition that variable pixel intensities result from the variable exposure time.

FIG. 7 illustrates the steps performed by the present invention during a typical scan. In step S30, the software calculates the average data transfer rate (see steps S1–S6 of FIG. 1 and the accompanying text). In step S31, the user inputs the desired horizontal resolution, vertical resolution, and horizontal scan size.

In step S32, the software calculates the StepSize value (see steps S22–S25 of FIG. 4 and the accompanying text) and the clock divider value (see steps S12–S15 of FIG. 2 and the accompanying text). The clock divider value is dependent upon the number of pixels to be scanned per line, so it is related to the horizontal resolution. The StepSize value is dependent upon the number of pixels to be scanned before moving the sensor, so it is related to the clock divider value and the horizontal resolution. As discussed above, some existing scanners control the stepper motor using the integration time. Because the present invention adjusts the clock frequency, this changes the integration time; therefore the present invention does not directly tie the StepSize value to the integration time.

In step S33, the software checks that the clock divider value and StepSize value are appropriate for the scanner hardware. Adjustment of the clock divider value by itself, and the StepSize value by itself, are performed in step S33 (incorporating steps S14 and S24–S25). However, if the minimum clock divider is greater than the maximum clock divider, for example, when performing a quick, low-resolution scan, the StepSize value must be increased to the value in the following equation:

$$NewStepSize = \frac{MasterClock}{FSPI \cdot M} \cdot \frac{1}{P \cdot C \cdot MaxSensorSpeed \cdot MaxClockDivider}$$

Adjusting the StepSize value in this manner causes the minimum clock divider factor to decrease to the maximum clock divider factor. This also changes the vertical resolution, so the software must instruct the ASIC to discard lines before transmission to the PC, or the software must itself process the extra lines, by discarding, interpolation, or other ways.

In step S34, the software tells the ASIC the appropriate horizontal resolution, horizontal scan size, StepSize, and clock frequency divider. In step S35, the ASIC scans the image at the selected resolution, scan size, and frequency, and the ASIC issues driving signals to the stepper motor according to the StepSize value.

Figure 8:
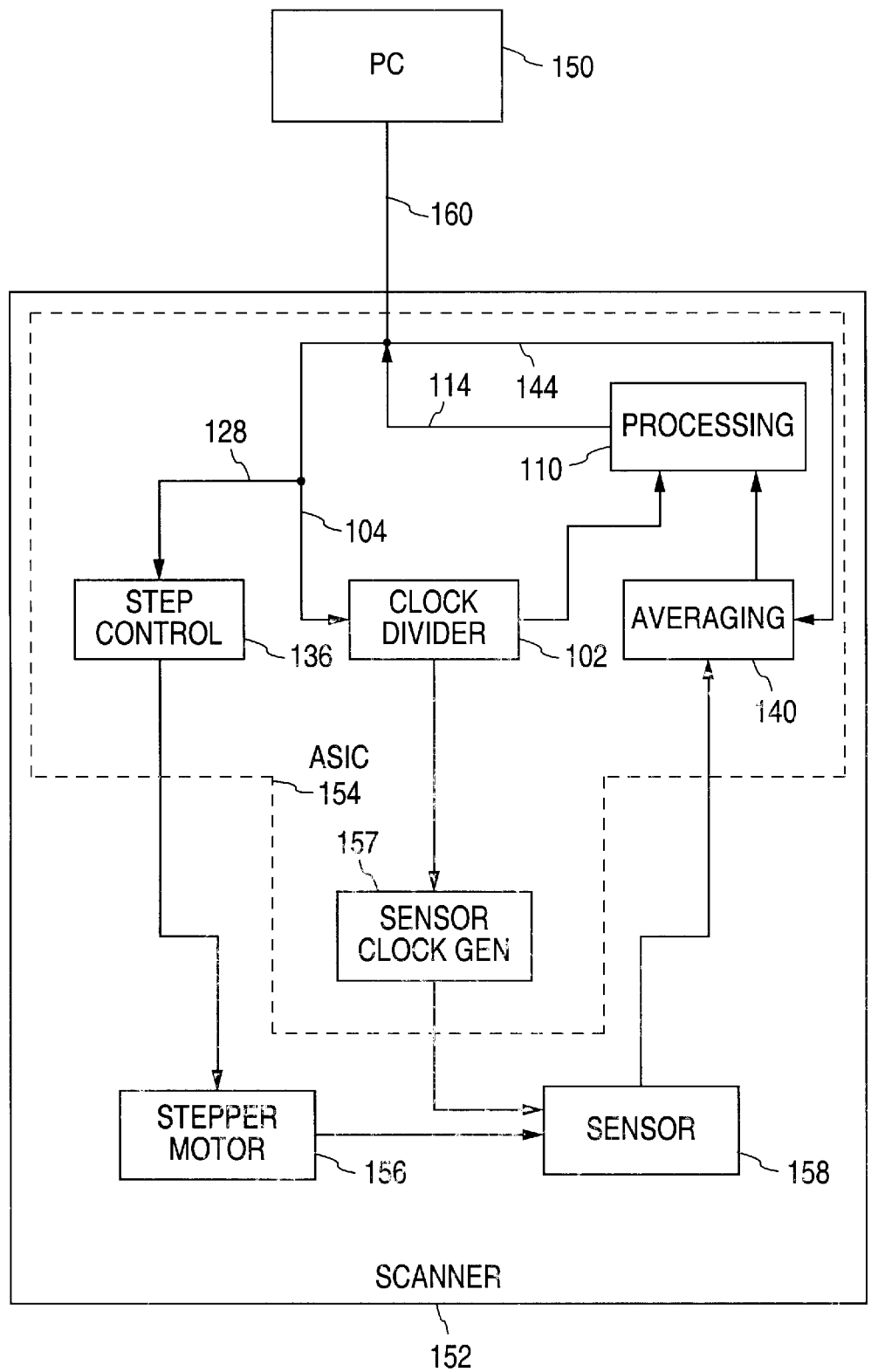
FIG. 8 is a block diagram for a scanner system including the present invention.

FIG. 8 illustrates a preferred embodiment of a scanning system including the present invention. A PC 150 runs the software that calculates the average data transfer rate, clock divider factor, StepSize, and pixel averaging factor. A scanner 152 includes an ASIC 154, a stepper motor 156, a sensor clock generation circuit 157, and a sensor 158. A communications link 160 allows commands to flow from the PC to the scanner, including the clock divider signal 104 (see FIG. 3), the StepSize value 128 (see FIG. 5), and the averaging signal 144 (see FIG. 6). Link 160 also allows the processed image data 114 (see FIG. 3) to flow from the scanner to the PC. The ASIC 154 includes clock divider circuit 102 and processing circuit 110 (see FIG. 3), step control signal generator 136 (see FIG. 5), and averaging circuit 140 (see FIG. 6).

The interaction of these three aspects of the present invention provides a number of benefits. First, the speed of scans may be increased because restarts are reduced, without having to run the entire scanner extremely slowly, which is a common method of eliminating restarts. Horizontal pixel averaging in the ASIC reduces the amount of data that must be transmitted to the PC. The ASIC may be required to process only those pixels that must be transmitted. Adjusting the clock frequency allows the scanning data rate to match the average data transfer rate. Controlling the stepper motor independently of the integration time allows a wide variety of resolutions so that only the lines that are to be transmitted to the PC need be scanned, further improving scan time.

Second, a wider variety of resolutions may be supported as compared to existing scanners. Although the horizontal resolution options may not be as varied as the vertical resolution options implemented in the ASIC, the software may perform further processing on the horizontal resolution so that it may be varied from that produced by the ASIC. Thus, if desired, the horizontal and vertical resolutions may be the same (or may differ from each other) over a wide variety of resolution options.

Third, although a preferred embodiment of the present invention uses the adjustable clock frequency to control the scanned data rate, the horizontal resolution and vertical resolution may also be varied to control this rate. For example, the scanned data rate is proportional to the horizontal resolution, so the pixel averaging factor may be adjusted to adjust the data rate. The scanned data rate is proportional to the number of lines scanned divided by the amount of time to scan each line, so the stepper motor may be controlled to adjust the data rate. In the present invention the software may be written to solve for any of these variables, and the ASIC responds according to the values set by the software.

Although the preferred embodiment has been discussed with reference to a scanner, similar principles may be applied to similar devices for transmitting scanned information, such as facsimile machines.

Furthermore, although the preferred embodiment describes the hardware of the present invention embodied in an information source device (the scanner) and the software embodied in an information target device (the PC), aspects of the present invention may be implemented in a single device.

It should be understood that various alternatives to the embodiments of the invention described herein may be employed in practicing the invention. It is intended that the following claims define the scope of the invention and that structures within the scope of these claims and their equivalents are covered thereby.

What is claimed is:

1. An apparatus including a circuit for controlling a scanner to increase data throughput, said circuit comprising:
   a data rate adjustment circuit configured to receive raw scanner data, a master clock signal, and a control variable, and in accordance therewith generate processed scanner data, wherein said master clock signal and said control variable control a rate at which said processed scanner data is generated, the rate adjustment circuit comprising:
      a clock adjuster circuit configured to receive a clock adjustment signal and said master clock signal, and in accordance therewith generate an adjusted clock signal, wherein said control variable includes said clock adjustment signal; and
      a processing circuit, coupled to said clock adjuster circuit, configured to receive said adjusted clock signal and said raw scanner data, and in accordance therewith generate said processed scanner data, wherein said adjusted clock signal controls said rate at which said processed scanner data is generated.

2. The apparatus of claim 1, further comprising:
   a vertical resolution control circuit configured to receive a vertical resolution control signal, and in accordance therewith generate a vertical resolution signal corresponding to one of a plurality of resolutions, wherein said control variable further includes said vertical resolution signal.

3. The apparatus of claim 2, wherein said vertical resolution control circuit comprises:
   a step signal generation circuit configured to receive a step size adjustment signal, and in accordance therewith generate a step signal corresponding to said one of a plurality of resolutions, wherein said vertical resolution control signal includes said step size adjustment signal.

4. The apparatus of claim 2, further comprising:
a horizontal resolution control circuit, coupled to said processing circuit, configured to receive a horizontal resolution control signal, and in accordance therewith control a horizontal resolution of said processed scanner data, wherein said control variable further includes said horizontal resolution signal.

5. The apparatus of claim 4, wherein said horizontal resolution control circuit comprises:
an averaging circuit configured to receive an averaging signal and in accordance therewith average together pixels of said raw scanner data to form said processed scanner data, wherein said horizontal resolution signal includes said averaging signal.

6. The apparatus of claim 1, further comprising:
a horizontal resolution control circuit, coupled to said processing circuit, configured to receive a horizontal resolution control signal, and in accordance therewith control a horizontal resolution of said processed scanner data, wherein said control variable further includes said horizontal resolution signal.

7. The apparatus of claim 6, wherein said horizontal resolution control circuit comprises:
an averaging circuit configured to receive an averaging signal and in accordance therewith average together pixels of said raw scanner data to form said processed scanner data, wherein said horizontal resolution signal includes said averaging signal.

8. An apparatus including a circuit for controlling a scanner to increase data throughput, said circuit comprising:
a data rate adjustment circuit configured to receive raw scanner data, a master clock signal, and a control variable, and in accordance therewith generate processed scanner data, wherein said master clock signal and said control variable control a rate at which said processed scanner data is generated, the rate adjustment circuit comprising:
a vertical resolution control circuit configured to receive a vertical resolution control signal, and in accordance therewith generate a vertical resolution signal corresponding to one of a plurality of vertical resolutions, wherein said control variable includes said vertical resolution signal; and
a processing circuit, coupled to said vertical resolution control circuit, configured to receive said master clock signal and said raw scanner data, and in accordance therewith generate said processed scanner data, wherein said master clock signal and said vertical resolution signal control said rate at which said processed scanner data is generated.

9. The apparatus of claim 8, wherein said vertical resolution control circuit comprises:
a step signal generation circuit configured to receive a step size adjustment signal, and in accordance therewith generate a step signal corresponding to said one of a plurality of resolutions, wherein said vertical resolution signal includes said step size adjustment signal.

10. The apparatus of claim 8, further comprising:
a horizontal resolution control circuit, coupled to said processing circuit, configured to receive a horizontal resolution control signal, and in accordance therewith control a horizontal resolution of said processed scanner data, wherein said control variable further includes said horizontal resolution signal.

11. The apparatus of claim 10, wherein said horizontal resolution control circuit comprises:
an averaging circuit configured to receive an averaging signal and in accordance therewith average together pixels of said raw scanner data to form said processed scanner data, wherein said horizontal resolution signal includes said averaging signal.

12. An apparatus including a circuit for controlling a scanner to increase data throughput, said circuit comprising:
a data rate adjustment circuit configured to receive raw scanner data, a master clock signal, and a control variable, and in accordance therewith generate processed scanner data, wherein said master clock signal and said control variable control a rate at which said processed scanner data is generated, the rate adjustment circuit comprising:
a horizontal resolution control circuit configured to receive a horizontal resolution control signal, and in accordance therewith control a horizontal resolution of said processed scanner data, wherein said control variable includes said horizontal resolution signal; and
a processing circuit, coupled to said horizontal resolution control circuit, configured to receive said master clock signal and said raw scanner data, and in accordance therewith generate said processed scanner data, wherein said horizontal resolution control signal and said master clock signal control said rate at which said processed scanner data is generated,
wherein said processed scanner data is transmitted to an associated device at said rate at which said processed scanner data is generated.

13. The apparatus of claim 12, wherein said horizontal resolution control circuit comprises:
an averaging circuit configured to receive an averaging signal and in accordance therewith average together pixels of said raw scanner data to form said processed scanner data, wherein said horizontal resolution signal includes said averaging signal.

14. An apparatus including a circuit for controlling a scanner to increase available resolutions, said circuit comprising:
a step signal generation circuit configured to receive a step size adjustment signal and in accordance therewith generate a step signal corresponding to one of a plurality of resolutions, wherein said plurality of resolutions corresponds to a non-integer number of steps per line; and
an averaging circuit configured to receive raw scanner data and an averaging signal, and in accordance therewith generate processed scanner data, wherein said averaging circuit controls a second resolution of said processed scanner data.

15. An apparatus including a circuit for controlling a scanner to reduce aliasing, said circuit comprising:
an averaging circuit configured to receive raw scanner data and an averaging signal, and in accordance therewith average together pixels to generate processed scanner data, wherein said averaging circuit controls a resolution of said processed scanner data.

16. The apparatus of claim 15, wherein:
said resolution of said processed scanner data is a non-integer fraction of a resolution of said raw scanner data.

17. The apparatus of claim 15, further comprising:
a scanner in which said circuit is incorporated.

18. A method of controlling a scanner to increase data throughput, said method comprising the steps of:
scanning an image to produce raw scanner data; and
generating processed image data at a target rate approximately equal to an average data transfer rate from a scanner to an associated device.

19. The method of claim 18, wherein said step of generating comprises:
adjusting a scanning clock frequency, wherein a portion of said processed image data is generated in a scanning clock period related to said scanning clock frequency, such that said processed image data is generated at said target rate.

20. The method of claim 19, wherein said step of adjusting comprises:
dividing a master clock frequency by one of a plurality of divider values to result in said scanning clock frequency such that said processed image data is generated at said target rate.

21. The method of claim 19, further comprising the step of:
adjusting a vertical resolution of said processed image data such that a quantity of raw scanner data is varied according to said vertical resolution.

22. The method of claim 21, wherein said step of adjusting a vertical resolution comprises:
adjusting a step size of relative movement between an image and a scanner sensor, wherein said step size corresponds to one of a plurality of resolutions.

23. The method of claim 21, further comprising the step of:
adjusting a horizontal resolution of said processed image data such that said quantity of said processed image data is less than said quantity of raw scanner data.

24. The method of claim 23, wherein said step of adjusting a horizontal resolution comprises:
averaging together pixels of said raw scanner data to produce said processed image data.

25. The method of claim 19, further comprising the step of:
adjusting a horizontal resolution of said processed image data such that a quantity of said processed image data is less than a quantity of raw scanner data.

26. The method of claim 25, wherein said step of adjusting a horizontal resolution comprises:
averaging together pixels of said raw scanner data to produce said processed image data.

27. The method of claim 18, wherein said step of generating comprises:
adjusting a vertical resolution of said processed image data such that said processed image data is generated at said target rate.

28. The method of claim 27, wherein said step of adjusting a vertical resolution comprises:
adjusting a step size of relative movement between an image and a scanner sensor, wherein said step size corresponds to one of a plurality of resolutions.

29. The method of claim 27, further comprising the step of:
adjusting a horizontal resolution of said processed image data such that said processed image data is generated at said target rate.

30. The method of claim 29, wherein said step of adjusting a horizontal resolution comprises:
averaging together pixels of said raw scanner data to produce said processed image data.

31. The method of claim 18, further comprising the step of:
adjusting a horizontal resolution of said processed image data such that said processed image data is generated at said target rate.

32. The method of claim 31, wherein said step of adjusting a horizontal resolution comprises:
averaging together pixels of said raw scanner data to produce said processed image data.

33. The method of claim 18, further comprising the step of:
calculating said average data transfer rate.

34. The method of claim 18, further comprising the steps of:
calculating said target rate; and
setting a control variable related to said target rate, wherein said scanned image data is generated based on said control variable.

35. A method of controlling a scanner to increase available resolutions, comprising the steps of:
adjusting a step size of relative movement between an image and a scanner sensor, wherein said step size corresponds to one of a plurality of resolutions, wherein said plurality of resolutions corresponds to a non-integer number of steps per line; and
scanning said image with said sensor using said step size; and
averaging together pixels of raw scanner data to produce processed image data such that a second resolution of said processed image data is reduced as compared to said raw scanner data.

36. A computer program embodied on a computer-readable medium for controlling a scanner to increase data throughput, comprising:
a target rate calculation subroutine that calculates a target rate approximately equal to an average data transfer rate from a scanner to an associated device.

37. The computer program of claim 36, further comprising:
an average rate calculation subroutine that calculates said average data transfer rate.

38. The computer program of claim 37, wherein said average rate calculation subroutine comprises:
a timing subroutine configured to store a start time and an end time of a data transfer, and to measure a difference between said start time and said end time;
a data transfer subroutine configured to transfer an amount of data from said scanner to said associated device; and
a dividing subroutine that divides said amount of data by said difference.

39. The computer program of claim 36, further comprising:
a control subroutine that sets a control variable related to said target rate, wherein said control variable controls scanning of an image such that processed image data is generated at said target rate.

40. The computer program of claim 39, wherein:
said control variable corresponds to a scanning clock frequency, wherein said scanning clock frequency controls a rate at which said processed image data is generated.

41. The computer program of claim 39, wherein:
said control variable corresponds to a vertical resolution value, wherein said vertical resolution value controls an amount of said processed image data that is generated.

42. The computer program of claim 39, wherein:
said control variable corresponds to a horizontal resolution value, wherein said horizontal resolution value controls an amount of said processed image data that is generated.

43. The computer program of claim 36, further comprising:
a step size calculating subroutine that calculates a step size of relative movement between an image and a scanner sensor, wherein said step size corresponds to one of a plurality of resolutions.

44. A scanner system comprising:
a sensor having a number of light sensing elements;
a processing system connected to the sensor that processes data from the number of light sensing elements, the processing system determining a step size based on the number of light sensing elements;
an image surface that supports an image;
a motor that provides movement between the sensor and the image surface;
a counter circuit connected to the processing system that counts count signals, and outputs a move signal each time a count total indicates that a step size has been counted; and
a motor control circuit connected to the counter circuit and the motor that turns on the motor to rotate a predetermined amount in response to the move signal to change a positional relationship between the sensor and the image surface.

45. The scanner system of claim 44 wherein the processing system outputs a processed signal each time a unit of data is processed, and the counting signal is the processed signal.

46. The scanner system of claim 44 wherein the processing system outputs a processed signal each time a unit of data is processed, and the counting signal is based on the processed signal.

47. The scanner system of claim 44 wherein the motor is a stepper motor.

48. The scanner system of claim 44 wherein the step size is determined by an equation that includes a first term divided by a second term, the first term including the number of light sensing elements multiplied by a resolution measured in a first direction in dots per inch (DPI), the second term including a full steps per inch (FSPI) value measured in the first direction multiplied by a number of microsteps per full step in the first direction.

49. The scanner system of claim 44 wherein the processing system includes an averaging circuit that receives light intensity values from a number of light sensing elements, determines an average light intensity value for the number of light sensing elements, and outputs the average light intensity value.

50. The scanner system of claim 44 wherein the processing system includes:
a first processor connected to the number of light sensing elements; and
a second processor connected to the first processor and the counting circuit.

51. The scanner system of claim 50 wherein
the second processor determines an average data transfer rate between the first processor and the second processor, and
the first processor processes units of data at the average data transfer rate.

52. The scanner system of claim 51 wherein the processing system outputs a processed signal each time a unit of data is processed, and the counting signal is the processed signal.

53. The scanner system of claim 51 wherein the processing system outputs a processed signal each time a unit of data is processed, and the counting signal is based on the processed signal.

54. A scanner system comprising:
a sensor having a number of light sensing elements,
a first processor connected to the sensor that processes data from the number of light sensing elements;
a second processor connected to the first processor that determines a step size based on the number of light sensing elements;
an image surface that supports an image;
a motor that provides movement between the sensor and the image surface;
a counter circuit connected to the second processor that counts count signals, and outputs a move signal each time a count total indicates that a step size has been counted; and
a motor control circuit connected to the counter circuit and the motor that turns on the motor to rotate a predetermined amount in response to the move signal to change a positional relationship between the sensor and the image surface.

55. The scanner system of claim 54 wherein the processing system outputs a processed signal each time a unit of data is processed, and the counting signal is the processed signal.

56. The scanner system of claim 54 wherein the processing system outputs a processed signal each time a unit of data is processed, and the counting signal is based on the processed signal.

57. The scanner system of claim 54 wherein the motor is a stepper motor.

58. The scanner system of claim 54 wherein the step size is determined by an equation that includes a first term divided by a second term, the first term including the number of light sensing elements multiplied by a resolution measured in a first direction in dots per inch (DPI), the second term including a full steps per inch (FSPI) value measured in the first direction multiplied by a number of microsteps per full step in the first direction.

59. The scanner system of claim 54 wherein the processing system includes an averaging circuit that receives light intensity values from a number of light sensing elements, determines an average light intensity value for the number of light sensing elements, and outputs the average light intensity value.

60. The scanner system of claim 59 wherein
the second processor determines an average data transfer rate between the first processor and the second processor, and
the first processor processes units of data at the average data transfer rate.

61. The scanner system of claim 60 wherein the processing system outputs a processed signal each time a unit of data is processed, and the counting signal is the processed signal.

62. The scanner system of claim 60 wherein the processing system outputs a processed signal each time a unit of data is processed, and the counting signal is based on the processed signal.

63. A scanner system comprising:

a sensor having a number of light sensing elements;

a processing system connected to the sensor that processes data from the number of light sensing elements, the processing system including an averaging circuit that receives a plurality of light intensity values from a plurality of light sensing elements, determines an average light intensity value for the plurality of light sensing elements, and outputs the average light intensity value;

an image surface that supports an image;

a motor that provides movement between the sensor and the image surface;

a counter circuit connected to the processing system that counts count signals, and outputs a move signal each time a count total indicates that a count has been reached; and a motor control circuit connected to the counter circuit and the motor that turns on the motor to rotate a predetermined amount in response to the move signal to change a positional relationship between the sensor and the image surface.

64. A scanner system comprising:

a sensor having a number of light sensing elements;

a first processor connected to the sensor that processes data from the number of light sensing elements;

a second processor connected to the first processor that determines an average data transfer rate between the first processor and the second processor, and controls the first processor to processes units of data at the average data transfer rate;

an image surface that supports an image;

a motor that provides movement between the sensor and the image surface;

a counter circuit connected to the second processor that counts count signals, and outputs a move signal each time a count total indicates that a count has been reached; and a motor control circuit connected to the counter circuit and the motor that turns on the motor to rotate a predetermined amount in response to the move signal to change a positional relationship between the sensor and the image surface.

* * * * *